United States Patent Office 3,418,482
Patented Dec. 24, 1968

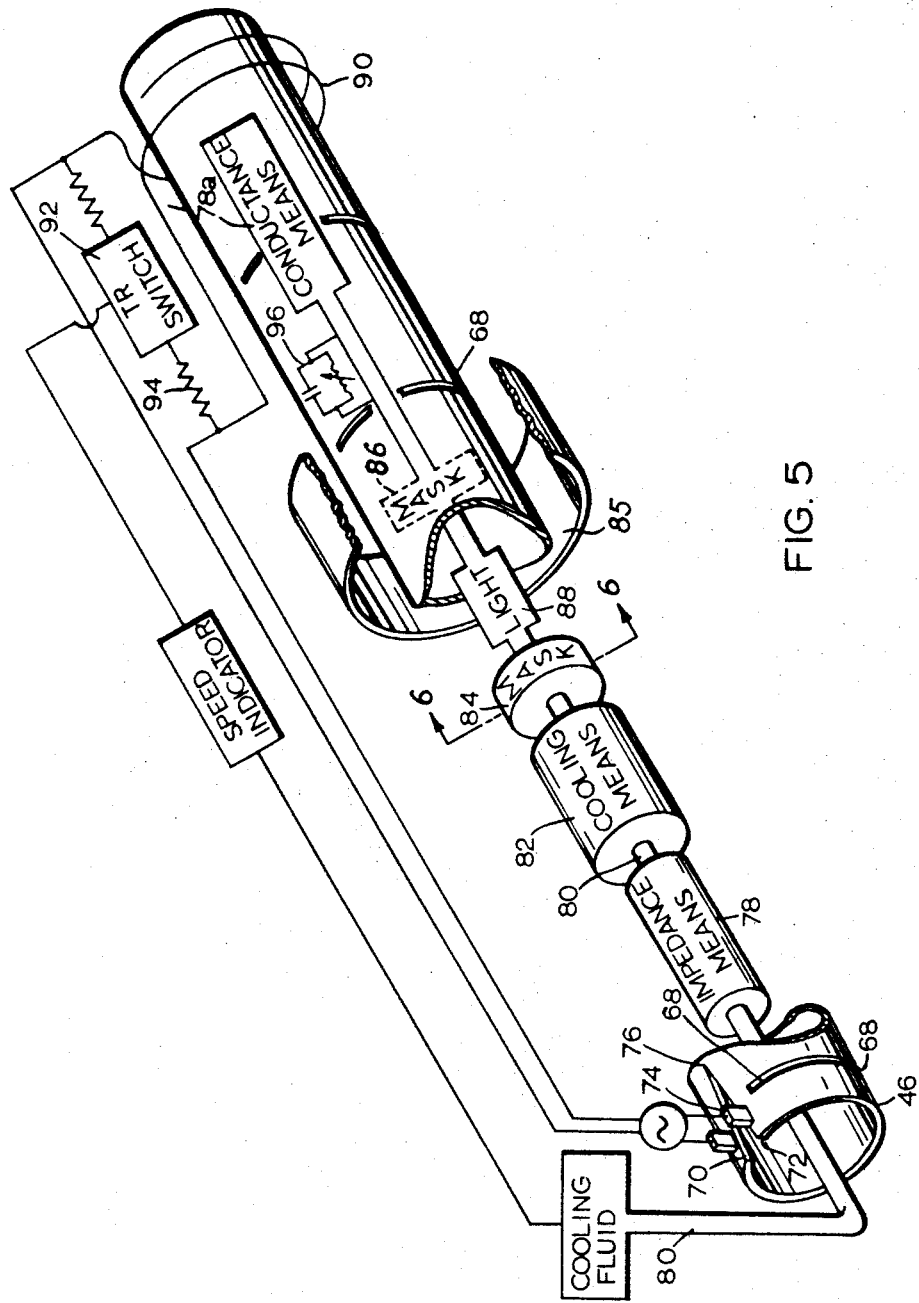

3,418,482
PINHOLE DETECTOR TESTING MEANS AND METHOD
Frederick Y. Masson, West Orange, N.J., assignor to General Precision Systems Inc., a corporation of Delaware
Continuation-in-part of application Ser. No. 356,784, Apr. 2, 1964. This application Dec. 31, 1964, Ser. No. 422,594
10 Claims. (Cl. 250—219)

ABSTRACT OF THE DISCLOSURE

A method and means for checking the operating effectiveness, during normal operation of a pinhole detector unit by intentionally making a predetermined number of holes in the material to be inspected and determining whether these holes are properly detected by the apparatus. The invention may be utilized in connection with either the inspection of essentially flat material or material which is formed from flat stock into a longitudinally sealed tube, as in the manufacture of metal cans.

---

This application is a continuation-in-part application of the Joseph C. Scanlon and Frederick Y. Masson U.S. patent application Ser. No. 356,784 filed Apr. 2, 1964.

The present invetnion relates to optical systems in general, and more particularly to methods and means for eliminating errors in such systems. As will become more fully apparent as this description proceeds, the present invention relates specifically in its applicability to optical systems which include a radiation sensitive detection means which responds to radiation of a particular wavelength range, a light source for exciting the radiation sensitive detection means and a carrier medium having alternating transparent and opaque sections interposed between the light source and the detection means. Accordingly, by the way of example, but not limitation, the invention will be described herein as applied to a particular apparatus embodying such an optical system, viz., a "pinhole detector," the common term of reference for devices which automatically inspect very thin sheets of metal, such as tin plate, or like material, for minute perforations.

The detection of pinholes is particularly important in the sale of sheet metal which will be later used as the stock for making cans. In this application, the stock from which cans are made, i.e., metal plate, is sent to the tube mill which will produce the cans in the form of large rolls of elongated flat strips wound on pay-off reels. The flat strips are then unwound from the pay-off reel along a long table between a multiplicity of rollers usually referred to as "squeeze rollers." The squeeze rollers gradually curve the strip laterally as it travels longitudinally across the table so that it takes on a tubular configuration with an open longitudinal seam. At this point, the open tube is led past a welding station where the two edges of the strip are welded together by means known in the art. The finished tube then travels along until it reaches a cut-off station where the tube is cut into can lengths. Afterwards, the bottoms are placed on the can in another operation.

The forming of the strip into a tube and the cutting up of the tube into cans is carried out very rapidly at hundreds of feet per minute, and in the case of certain stock, difficulty is encountered in cutting off the tubes at the cut-off station. To facilitate the cut-off operation, it is sometimes necessary to partly cut into the width of the stock so that, effectively, the tubing is cut into can lengths even before it becomes tubing. The cut can, usually made of thin "tin plates," usually from 8 to 20 mils in thickness must not have pinholes. To prevent the making of cans with pinholes, two inspections are required. First, the flat material shipped from the supplier, long before it is formed into a can, must be inspected. However, a second inspection is required of the formed cans to detect pinholes made during the manufacture. There are many reasons why material, which is in perfect condition at the supplier, will have pinholes when formed into cans. The hole can exist because of an imperfect weld. Also, holes may be caused by the action of the cooling fluid, e.g., water, grease, etc., at the welding station. The rapid temperature change as the strip is formed into cans can also cause pinholes. With a rapidly moving production line, a thousand cans can be cut before the first pinhole is discovered, which will mean untold waste, not only in material, but also in man hours which must be spent to inspect each can suspected of having holes.

It is, therefore, apparent that two inspection points are required. The first inspection point should be at the supplier to insure that no defective stock is shipped to the can-making tube mill. The tube mill receiving station may, of course, for its own protection have its own first inspection point which would be substantially the same kind of equipment as the supplier. The second inspection station appears necessary past the welding station and before the cut-off station. However, as already explained, here the tubing may already be partly cut off into cans to facilitate the work at the cut-off station. Also, the welding station is usually quite near the cut-off station and there is considerable equipment in this vicinity for the purpose of welding the strip into a tube, cooling, current directing impedance means, guide rollers, etc.

The present invention relates to an optical pinhole detection system and, broadly, there are two embodiments to the system; one to inspect flat stock before the welding station, and the other to inspect the formed tube which will be cut off into cans. One of the particular problems to which the present invention relates is to the testing of the detector. Obviously, if the detection means are not functioning properly, the result is worse than if there are no detection means at all.

Therefore, an object of the present invention is to provide a testing arrangement for radiation sensitive detection means which will automatically ascertain whether the detection means are functioning properly.

Another object of the present invention is to provide pinhole detection means particularly in can making and includes pinhole detection means for the flat stock and for the formed tubing before it is cut into cans.

A further object is to provide a novel method of insuring the operating effectiveness of pinhole detector apparatus during operation thereof to inspect a traveling length of material for the presence of pinholes.

Other objects and advantages will become apparent from the following description and the accompanying drawing in which:

FIG. 1 is a block diagram of the pinhole detector and the associated testing arrangement contemplated herein;

FIG. 2 provides a perspective view of some of the components of the testing arrangement described in block diagram in FIG. 1;

FIG. 5 is a fragmentary perspective view, partially schematic of another embodiment of a pinhole detector contemplated herein; and, FIG. 6 is a front view along the lines 6—6 of FIG. 5.

Before going into a detailed description of the invention, it is preferable to first see what is to be accomplished and examine generally how the present inventive concept proceeds to carry out its mission.

As already known, a flat strip is inspected for pinholes by passing the strip between a light source and light sensitive detection means. As long as no light passes through the strip onto the detection means, no output signal is received signifying that there are no pinholes. It is at once apparent that two sources of error exist. Light will leak around the edges, and the detection means may not be functioning properly. In general, the problem of leakage around the edges is dealt with in the parent application, Ser. No. 356,784. This problem exists, of course, only with a flat strip. With respect to formed tubing for cans, another light leakage problem exists which is described later herein. The present application relates mostly to the prevention of error information when the detection means are either not functioning properly or, since a plurality of such means are used, if they are functioning unequally. Since the system for detecting pinholes in a flat strip is somewhat less complicated than that for detecting pinholes in a formed tube, the system for detecting the pinholes in the flat strip will be first described in connection with the error prevention means.

Figure 1:
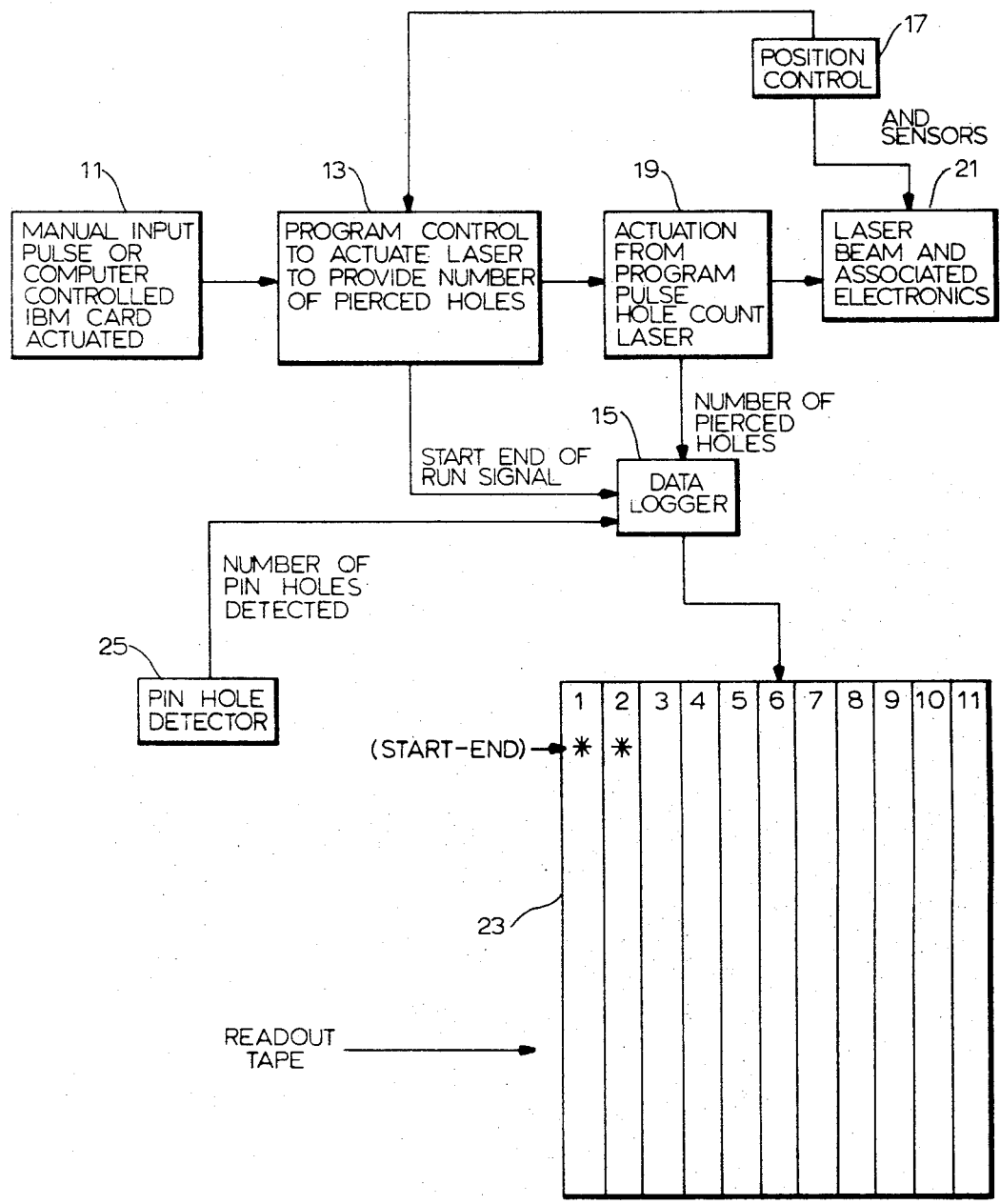

The testing of the detection means is illustrated in block diagram in FIG. 1 which could be an illustration of a supplier's testing station before a roll of sheet metal is sent out to a customer. The testing is started either by a manual input pulse or by a signal from a computer-controlled punched card containing the customer's code identification and the test specification which the customer desires to be met. This starting pulse is supplied by input pulse box 11. The input pulse is fed to a program control 13 which controls the mechanism to form a number of test holes. The program control will vary with the width of the strip and in turn actuates several other components. The data logger 15 is actuated by the program control and will record the number of pierced holes at the start and at the end of the test run. The position control 17 will move test hole making means laterally across the strip. This is actuated by the program control when it is on one side of the strip and it gradually will move the test hole making means over to the other side of the strip. The hole count means 19 will, upon actuation by the program control, in turn act on the test hole making means, also at the same time supply a count to the data logger each time a test hole is made. When the input pulse is given to the program control 13 by the input pulse box 11, the position control located on one side of the strip will start moving over to the other side of the strip. Mounted on the position control 17 is the test hole making means, i.e., laser beam 21 with associated electronics. This laser beam is actuated periodically by the hole count means 19 which in turn depends on the output from program control 13. Depending on the width of the strip and the test desired, the laser beam will place a number of holes in the passing strip. Each hole so made is recorded by a data logger 15 on a strip of paper. After the laser beam in the path of travel of the strip is the pinhole detector 25, such as described in the parent application, Ser. No. 356,784. This pinhole detector 25 likewise provides an output to the data logger 15 and again the number of pinholes is recorded. There should then be at least the same amount of pinholes detected by the pinhole detector 25 as were made by the test hole making means 21. There can, of course, be more holes than test holes if the tested piece is defective, but there should not be less holes if the detection means in the pinhole detector 25 are functioning properly. A lower hole count indicates that either one of the detection cells is not functioning at all, that there is an unbalance in the output from the various cells, or that the radiation source in the pinhole detector is defective.

Figure 2:
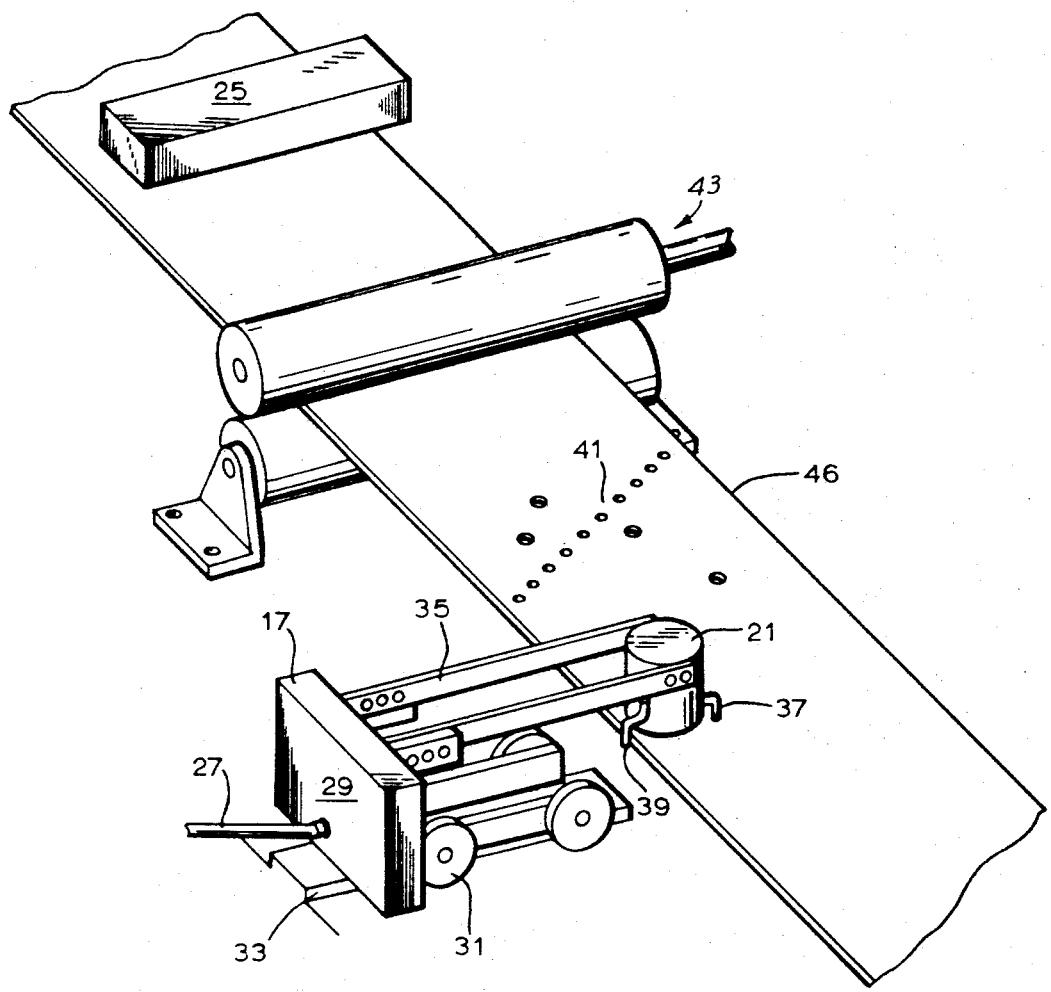

A portion of the arrangement described in block diagram in FIG. 1 is shown in perspective in FIG. 2. Here is shown the position controller 17 which is in fact a motor with gearing (not shown) moving a rod 27 which in turn acts on a carriage 29. Carriage 29 moves on a trolley 31 and tracks 33 which extend under the strip to be tested. A carriage arm 35 carries a laser source 21 so disposed as to shoot a laser beam down on the passing strip as it moves laterally across the strip. As already stated, the number of holes made by the laser beam depends on the program control. The laser source 21 includes a fore and aft edge sensing means 37 and 39. These fore and aft edge sensing means may be mechanical and thus require physical contact between the strip and the sensing means, or they may be photocell sensing means as described in the parent application, Ser. No. 356,784. As the laser source 21 travels across the strip, an angular series of pinholes 41 are formed. The strip to be tested is fed to guide rollers 43 and thence to the pinhole detector 25 which is the subject of the aforesaid parent application, Ser. No. 356,784.

Figure 3:
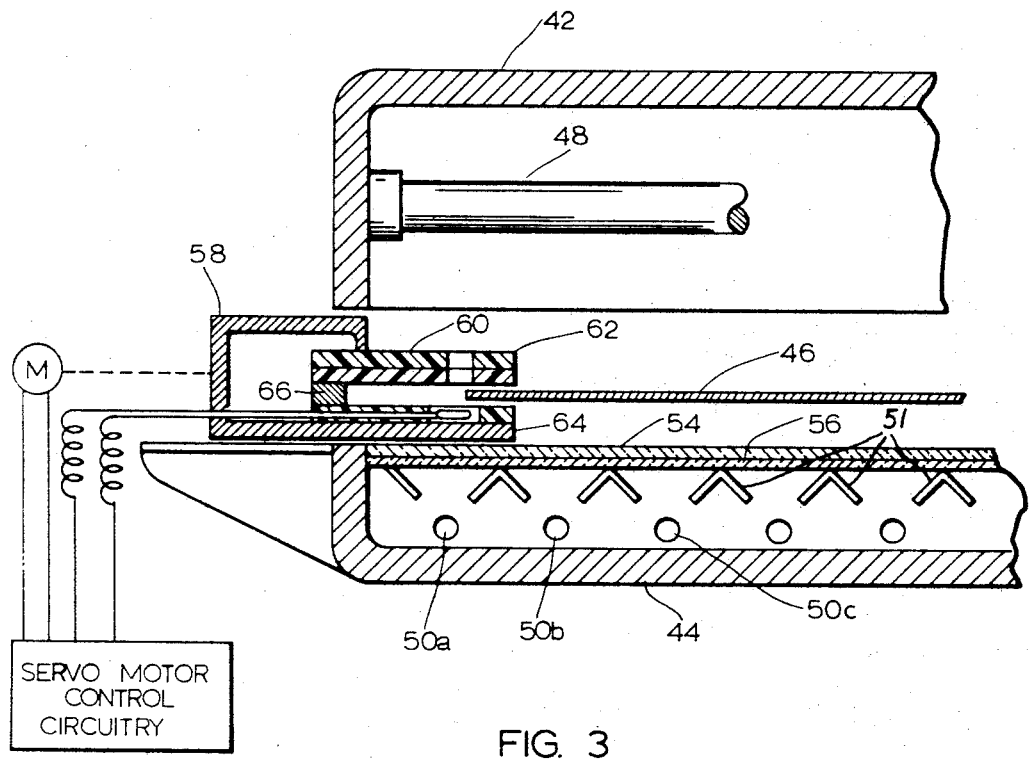
FIG. 3 is a fragmentary sectional view, partially schematic of one embodiment of a pinhole detector contemplated herein.

As has previously been pointed out, the output from the pinhole detector 25 to the data logger should be equal to or greater than the number of holes purposely formed by the laser source 21. If a lesser count is obtained, three possibilities are presented; either one of the photomultiplier tube sensing means is not functioning, or else the output from the different photomultiplier tubes are sufficiently unequal as to provide an incorrect output, or the radiation source is not functioning. The problem may perhaps best be understood by reference to FIG. 3 showing the construction of pinhole detector 25.

The basic construction of pinhole detector 25 is conventional and, therefore, has been shown more or less schematically. It consists of a housing made up of an upper section 42 and a lower section 44 disposed and supported in spaced relation by structure, not shown, to permit indeterminate lengths of sheet material 46 to traverse therebetween.

Housing sections 42 and 44 are elongated in a direction transverse to the direction of movement of tin plate 46 (which is perpendicular to the plane of the paper in FIG. 3) and are substantially the same at each end. Upper section 42, of inverted-trough-shaped configuration contains a source of ultraviolet light which, in the illustrated embodiment, is a fluorescent tube 48. Lower housing section 44, also trough-shaped but disposed in an upright attitude, contains a bank of photomultiplier tubes 50a, 50b, 50c . . . arranged in a single row at uniformly spaced intervals. Pairs of reflectors 51, diverging upwardly from each photomultiplier tube, funnel light to the respective tubes.

Overlying the bank of tubes and reflectors, and closing the top of lower housing section 44, is a plate 54 of Pyrex glass superposed on a plate 56 of filter glass or the like adapted to transmit only the particular UV wavelength emitted by tube 48, e.g., about 3600 A. From the structure thus far described it will be seen that, as sheet material 46 is drawn through the apparatus, UV light from source 48 will pass through any pinholes in the material and, impinging on the underlying photomultiplier tube, will produce an output signal via conventional circuitry, not shown.

In order to accommodate tin plate stock of different nominal width and to compensate for width variations which are characteristic of rolled strip, a shutter assembly 58 is provided to prevent UV from source 48 passing around the edge of tin plate 46 and causing spurious signals from the detector tubes.

Due to the irregular edge of the tin plate, and to avoid wear and prevent ruffling the edges of thin stock, shutter assemblies are necessarily designed to operate without making physical contact with the edges of sheet 46. To this end, the shutter proper, 60, takes the form of an assemblage of baffle plates which is U-shaped when viewed in section along a plane perpendicular to tin plate 46, the edge of which passes between the legs of the U. Specifically, shutter 60 consists of an upper baffle plate 62 and a lower baffle plate 64 separated by a suitable spacer, such as block 66, between the outer edges of the plates. These features have been described in greater detail in the aforementioned co-pending parent application, Serial No. 356,784.

Figure 4:
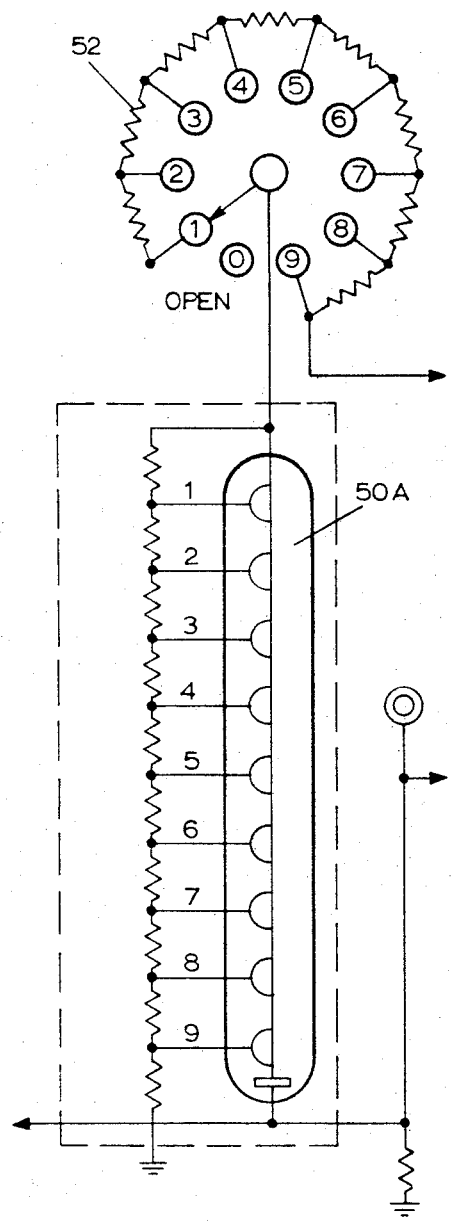
FIG. 4 depicts schematically an equalization and testing circuit for some of the components used with the pinhole detector contemplated herein.

The photomultiplier tubes depicted schematically in FIG. 3 are illustrated in greater detail in FIG. 4. If one of these tubes is completely defective, there is, of course, no alternative but to replace it. However, quite often this is not the case and, furthermore, when this is not the case, the replacing of the tube causing the difficulty will often not solve the problem. As can be seen in FIG. 3, there is in fact a bank of tubes and, although the output from these tubes does not have to be identical, there should be sufficient uniformity in their output to supply proper information to the data logger. As is well known by tube manufacturers, even the supplying of tubes with identical characteristics at the start does not solve the problem since with the passage of time, there is a drift in the sensitivity of the various tubes which quite often differs from tube to tube so that after a much longer time, some tubes will be almost like new while others will be completely worthless. To adjust the tubes to provide a uniform sensitivity across the detector width, there is, therefore, provided, as shown in FIG. 4, a voltage divider adjustment 52 for the photomultiplier tube 50. This adjustment has a plurality of positions and in each position a resistance is added in series to the tube. Thus, the adjustment is based on the strongest tube which is biased down to the strength of the weakest. In addition, there is an open position which is extremely useful in checking out individual tubes for noise and high dark current. It is sometimes possible that one pinhole will provide an output signal on two tubes. This can occur through defects in the detector apparatus other than the tubes. To test for this possibility, as well as to test for other defects, e.g., defects in the data logger itself, one or more of the photomultipliers can be set on the potentiometer adjustment 52 open position.

As already mentioned, the inspection of the sheet material will insure that the material to be formed into cans is free of pinholes, but a second inspection is required for those holes formed during the making of the cans, e.g., by defects in the machinery. To do this, an inspection station is required between the welding zone and the cut-off zone of the apparatus. In FIG. 5, the strip 46 is shown after it has been partly shaped into a tube. For convenience, the numerous squeeze rollers are omitted and the table along which the strip travels is not shown. The view shown starts just before the welding zone and ends towards the cut-off zone. Because of the difficulty encountered in cutting off the cans, the strip to be formed into tubing has partially been cut by cuts 68 into can lengths. These cuts extend only partially across the width of the can since the can must still be welded along the edges 70, 72. This is accomplished by means known in the art, e.g., high frequency A-C welding and, to this end, a pair of welding contacts 74 engage the edges 70 and 72. The two opposed edges 70 and 72 are brought together at a weld point 76 in advance of the electrodes, the current running along the edges 70, 72 to the weld point and fusing the two edges into a longitudinal seam. Since there is a strong tendency for the current to go around the back of the tube where it is not wanted and not needed, impedance means 78 are inserted beneath the weld point. Since this is high frequency A-C, the current tends to follow the path of least reluctance as opposed to the path of least resistance for low frequency A-C and will thus travel along the edges, i.e., the path of high resistance, but low reluctance instead of going around the back of the tube, namely, the path of low resistance, but high reluctance. These impedance means 78 are held in place by holding means 80 passing through the gap in advance of the weld point down vertically into the tube and then horizontally parallel to the tube axis, or even along the tube axis. In addition to the impedance means 78, the holding means 80 also have mounted thereon cooling means, usually a spray arrangement, which will spray a cooling fluid on the tubing past the weld point. There is, therefore, a hollow tubing within the holding means or the holding means 80 is itself the hollow tubing for the passage of a cooling fluid, e.g., water.

In the case of certain greases, e.g., silicone grease, which might have optical properties and cause false readings, it is sometimes preferable to color the cooling fluid black. Usually, the cooling fluid is recovered and recirculated so that after a while, it naturally tends to become black anyways, but some trouble may be expected at the start of a run if shiny new silicone grease is used as the cooling medium. Mounted on holding means 80 past the cooling means 82 are front and rear cylindrical masks 84 and 86. These masks are to prevent the penetration of light into the pinhole detector. Between the front and rear masks is an ultraviolet light source 88. This light source 88 is in fact a strobe light and is not operated continuously otherwise a false signal would be given every time a slit 68 passed before the light. To prevent such a false signal, the ultraviolet light source operates only when the slits 68 are over the mask; while the slits are passing before the light source 88 the light source gives forth no light. The actuation of the light source 88 is accomplished by inductive trigger means 90. This comprises generally a large number of turns of wire held around the formed tubing, one or more multiples of can lengths away from the pinhole detector. If there is room, it should be located in advance of the detector, but, sometimes, there will not be room there and it can be located past the detector at the cost of one or two cans. Passing through the inductive trigger means 90 is an excitation current supplied by the high frequency A-C power source and in parallel across the inductive trigger means 90 are trigger switch means 92 and high value resistance means 94. Now, while the tubing without the slit is passing through the inductive trigger means 90, the inductive trigger means present a large reluctance to the flow of current through the coils and, in effect, the coils act as choke coils. This forces the high frequency A-C current through the parallel path of the high value resistors 94 and trigger switch 92. However, as the slit 68 comes through the coils, there is an immediate elimination of a large part of the reluctance to the flow of current through the coil so that, momentarily, the flow of current across the parallel path of switch 92 and resistors 94 drops towards zero. This drop in current triggers off switch 92 which is coupled to light source 88 by circuitry passing along the holding means 80. In this way, the light source 88 will flash only at the instant that the slit passes through the inductive trigger means 90. As has been already explained, the flow of the high frequency A-C current at the welding station is somewhat enhanced by the proper use of impedance means 78. The same principle is used at the inductive trigger station, except this time it is the conductance across the coil which must be enhanced so that the sharpness of the trigger can be improved by use of conductance coil means 78a disposed on the holding means. This conductance coil means 78 may consist of a simple circuit of only one or a few turns likewise fed by the high frequency A-C power source but out of phase with the excitation current through the inductive trigger means. As is well known, like currents repel and unlike currents attract so that the flow of an excitation current in one phase through the conductance coil means will attract current of the opposite phase through the inductive trigger means. However, when the tubing and not the slit is passing between the conductance means 78a and the trigger means, then the tubing acts as a shield between the conductance means and the inductive trigger means. The phase shift for the conductance means may be accomplished by means of a phase lagging circuit 96, e.g., a capacitor, inductance coil arrangement.

Figure 6:
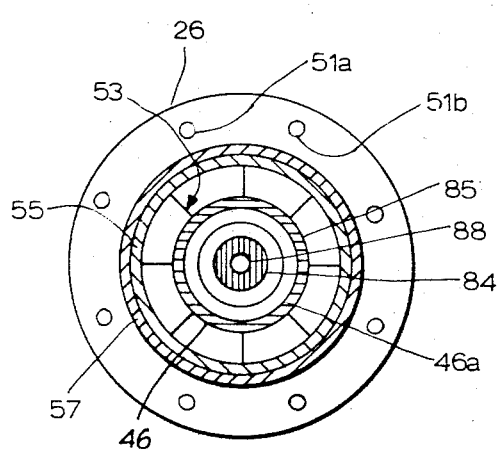

Needless to say, associated with masks 84 and 86 within the tubing are corresponding outer masking means 85 around the tubing. These are shown in FIG. 6, showing only masking means 85 associated with front mask 84. The outer masking means associated with rear mask 86 is not shown since the positioning of this masking means is identical with outer masking means 85. The pinhole detector 26 is cylindrical and has radial reflectors 53 similar to reflectors 51 for the pinhole detector used for a flat strip. Overlying the bank of reflectors 53 and around the inner cylindrical wall of detector 26 is a plate 55 of Pyrex glass superposed on a plate 57 of filter glass, or the like, adapted to transmit only the particular UV wavelength emitted by the light source 88, e.g., about 3600 A. The reflectors 53 define a plurality of zones and in each zone is a photomultiplier tube 51a, 51b, etc. As the tube passes through the apparatus, UV light from source 88 will pass through any pinholes in the material and impinge on the surrounding photomultiplier tube to produce an output signal to be recorded on the data logger. In testing the detector at this station, the test holes are made not in the partly formed cans, but in the strip of material, i.e., before the welding station, i.e., regardless of whether it is the flat strip or partly-formed cans which are being tested for holes, the test holes are made as in FIG. 2 on the flat strip.

In describing the foregoing invention, emphasis has been on the particular inventive features of the present application, and those components well known in the prior art and purchased commercially have been functionally described. Thus, the laser beam used for making test holes can in practice be a Ratheon, Trion TRG ruby laser. The data logger and its associated equipment, such as the printer, can be obtained from Hewlett-Packard or Berkley. Switching circuits responsive to current changes are well known in the art.

It is to be observed, therefore, that the present invention provides for a pinhole detector which also has a self-testing system and comprises radiation sensing means, including mounting means for mounting said sensing means in the vicinity of the workpiece to be tested for pinholes on one side thereof and supplying an output signal each time a hole is sensed; radiation source means to emit radiation, including mounting means for mounting said source means in the vicinity of the workpiece on the other side thereof so that radiation from said source means will impinge on said sensing means if it passes through a pinhole in said workpiece; hole making means for producing at least one test hole in said workpiece; actuation means to actuate said hole making means and produce an output signal each time said hole making means is actuated; data logging means recording each time a test hole is made by said hole making means and each time an output signal is supplied by said sensing means; and, position control means responsive to said actuating means to move said hole making means relative to said workpiece so that the test hole can be made in predetermined locations. In practice, the sensing means will have a plurality of individual sensors, and as the position control means moves the hole making means relative to the workpiece, the actuating means will actuate the hole making means a plurality of times while supplying an output to the data logging means. The number of output signals from the sensing means and recorded on the data logging means then must be at least equal to the number of holes made by the hole making means. The hole making means is preferably a laser beam moved laterally across the workpiece. The sensing means consists of a bank of photomultiplier tubes, each tube having a voltage divider adjustment in series therewith to equalize the output from the various tubes so that each tube supplies substantially the same output signal in response to the same amount of radiation impinging thereon. The pinhole detector may be used for the detection of pinholes in a flat strip workpiece in which case the sensing means and radiation source are lodged in housing sections elongated in a direction transverse to the direction of movement of the workpiece, one housing section being on one side, the other housing section being on the other side of said workpiece. The light source in one housing section is usually a tube of ultraviolet light, while the sensing means in the other housing section is usually a bank of photomultiplier tubes in a single row at uniformly spaced intervals separated by reflectors diverging towards the workpiece. It is also possible to test formed tubing (cylindrical or rectangular) for pinholes; in this case, the pinhole detector is preferably so constructed that the radiation source is mounted within the formed tubing and the detection means is mounted outside around the formed tubing. In the event that the formed tubing is already partially cut, front and rear masks are provided at the predetermined cut lengths on each side of the radiation source. The radiation source is stroboscopic and the source is actuated by inductive trigger means coiled around the formed tubing. This inductive trigger means has a high value resistance in parallel therewith, and a high frequency A-C excitation is required to operate the inductive trigger means, said frequency being of the order of one hundred cycles or higher. A feedback loop is provided between the trigger means and the stroboscopic source. As the tubing passes through the trigger means coiled around the tubing, a high reluctance is offered to the passage of the high frequency A-C current so that the current passes through the parallel high resistance. As the cut passes through the trigger means coiled around the tubing, this high reluctance momentarily disappears and the current goes around the coil rather than around the high resistance. Switch means are so disposed in the circuit of the inductive trigger means and its parallel high resistance that this momentary passage of current through the trigger means coil enables the switch and closes the strobe circuit. This enabling of the switch may be enhanced by providing a second circuit of a small number of turns of wire within the tubing in combination with inductance-capacitance means to offset the phase of the second circuit with regard to the inductive trigger means circuit. This second circuit, i.e., conductance coil means, being fed an excitation current from the same high frequency A-C source as the inductive trigger means. Since opposite phases attract each other, the current flow in the second circuit will induce the current in the inductive trigger means circuit to flow through the coil instead of the high resistance.

An additional use of this inductive trigger means circuit is as a speed indicator of the speed of the passage of tubing through the pinhole detector station. This speed indication in advance of the cut-off station may be used to provide information if the cut-off mechanism is properly timed at the cut-off station.

By the present inventive concept, the detector is tested under dynamic operational conditions rather than under static conditions. This is of particular importance since when testing under static conditions, it is usually impossible to understand the cause of the pinholes.

While there has been described what at present is believed to be the preferred embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. In apparatus for detecting the presence of pinholes in a traveling length of thin material by means of photodetectors arranged on one side of said material to generate a signal in response to light passing through a pinhole therein, means for simultaneously checking the operating effectiveness of said apparatus, said means comprising, in combination:
- (a) piercing means for intentionally making a predetermined number of holes in said material;
- (b) actuating means operable to cause said piercing means to make said holes; and
- (c) counting means indicating the number of signals generated by said photodetectors, thereby providing a basis for comparison of the number of said signals generated with said predetermined number.

2. The invention according to claim 1 wherein a plurality of said photodetectors, laterally spaced across said material, are provided to generate independent signals in accordance with the lateral position of a pinhole in said material, and further including positioning means for moving said piercing means laterally across said material so that holes may be made adjacent each of said photodetectors.

3. The invention according to claim 1 wherein said material comprises a metal stock which is initially in the form of a flat web and is formed while traveling into a longitudinally sealed tube, said piercing means being positioned to make said holes while said metal is in flat form, and further
- (a) a light source adapted to emit radiation to which said photodetectors are sensitive; and
- (b) holding means constructed and arranged to support one of said light source and photodetectors inside said sealed tube and the other immediately adjacent on the outside of said tube.

4. The invention according to claim 3 wherein said metal includes lateral cuts extending through and partially across said metal at predetermined intervals along the length thereof, and further including:
- (a) strobe means adapted to turn said light source on and off in rapid sequence; and
- (b) synchronizing means for so timing the cycle of said strobe means with respect to travel of said material that said light source is off whenever one of said lateral cuts passes between said light source and said photodetectors.

5. The invention according to claim 4 wherein said light source is positioned inside said tube and said holding means also support mask means constructed and arranged to prevent passage of light from said source through adjacent lateral cuts in said tube when said source is turned on.

6. The invention according to claim 4 wherein said synchronizing means comprise inductive trigger means actuated by passage of said lateral cuts in said material past a coil.

7. The method of inspecting a traveling length of material to detect the presence of pinholes in said material while insuring the operating effectiveness of the detecting apparatus, said method comprising the steps of:
- (a) positioning a light source on one side and light sensing means on the opposite side of said material at an inspection station, whereby said sensing means are actuated to prdouce a signal in response to light from said source passing through a pinhole in said material;
- (b) intentionally making a predetermined number of pinholes in said material before the latter passes said inspection station; and
- (c) counting the number of signals produced by said sensing means after the portion of said material having said predetermined number of pinholes passes said inspection station to determine whether or not said number of signals equals or exceeds said predetermined number.

8. The invention according to claim 7 wherein said material comprises a thin metal stock initially in the form of a flat web and formed while traveling into a longitudinally sealed tube, said pinholes are made while the metal is in flat form and said inspection station is positioned after the metal is in tubular form.

9. The invention according to claim 8 and including the further steps of:
- (a) making lateral cuts extending through and partially across said metal at predetermined intervals along the length thereof before the metal passes said inspection station; and
- (b) sequentially turning said light source on and off in synchronism with movement of said metal so that said light source is off whenever one of said lateral cuts passes between said light source and said light sensing means.

10. The invention according to claim 9 wherein the step of making said lateral cuts is performed while said metal is in flat form.

References Cited

UNITED STATES PATENTS

| | | | |
|---|---|---|---|
| 2,947,876 | 8/1960 | Larew | 250—219 |
| 3,238,357 | 3/1966 | Minka | 250—219 X |
| 3,263,086 | 7/1966 | Brosious et al. | 250—219 |
| 3,265,855 | 8/1966 | Norton | 331—94.5 X |
| 3,335,283 | 8/1967 | Gingras et al. | 250—219 |

OTHER REFERENCES

"Third International Satellite is up . . . A Goddard-Managed Program," Goddard News; vol. 6, No. 10, April 6, 1964, pp. 4 and 5.

RALPH G. NILSON, *Primary Examiner.*

T. N. GRIGSBY, *Assistant Examiner.*

U.S. Cl. X.R.

88—14; 250—223